(12) United States Patent
Huang et al.

(10) Patent No.: US 10,949,896 B2
(45) Date of Patent: Mar. 16, 2021

(54) DISTRIBUTION OF EMBEDDED CONTENT ITEMS BY AN ONLINE SYSTEM

(71) Applicant: Facebook, Inc., Menlo Park, CA (US)

(72) Inventors: Eric Hsin-Chun Huang, Foster City, CA (US); Abhishek Bapna, Mountain View, CA (US); Asad K. Awan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 186 days.

(21) Appl. No.: 16/048,903

(22) Filed: Jul. 30, 2018

(65) Prior Publication Data

US 2020/0034892 A1    Jan. 30, 2020

(51) Int. Cl.
| | |
|---|---|
| G06Q 30/02 | (2012.01) |
| G06F 16/957 | (2019.01) |
| G06F 16/958 | (2019.01) |
| G06F 16/2457 | (2019.01) |
| G06F 16/248 | (2019.01) |
| G06Q 50/00 | (2012.01) |

(52) U.S. Cl.
CPC ....... *G06Q 30/0277* (2013.01); *G06F 16/248* (2019.01); *G06F 16/24578* (2019.01); *G06F 16/958* (2019.01); *G06F 16/9574* (2019.01); *G06F 16/9577* (2019.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,219,447 | B1* | 7/2012 | Ieong | G06Q 30/0244 705/14.43 |
| 9,183,259 | B1* | 11/2015 | Marra | G06F 16/9535 |
| 2011/0217022 | A1* | 9/2011 | Miller | G06O 30/08 386/278 |

(Continued)

OTHER PUBLICATIONS

Adrian Grahams, "How to Embed YouTube with Advertising", 2011, https://smallbusiness.chron.com/embed-youtube-advertising-28701.html, p. 1 (Year: 2011).*

(Continued)

*Primary Examiner* — John Van Bramer
(74) *Attorney, Agent, or Firm* — Fenwick & West LLP

(57) ABSTRACT

An online system receives host content items and supplementary content items to be presented in conjunction with one another. In embodiments, the online system receive an allocation of display instances of supplementary content items with host content items during a time interval. For a host content providers, the online system receives a count of display instances of supplementary content items in conjunction with host content items. The online system determines a content quality score based on user interactions with content from the host content provider and a count of display instances for host content items presented in conjunction with supplementary content items for a preceding time interval. The online system determines a content quality threshold based and, for host providers with content quality scored below the threshold, presents host content items in conjunction with supplementary content items to a user.

18 Claims, 4 Drawing Sheets

(56) References Cited

U.S. PATENT DOCUMENTS

| | | | | |
|---|---|---|---|---|
| 2015/0149261 A1* | 5/2015 | Walkingshaw | .. | G06Q 10/06395 |
| | | | | 705/7.41 |
| 2017/0024764 A1* | 1/2017 | Mooser | .............. | G06Q 30/0275 |
| 2019/0080352 A1* | 3/2019 | Modarresi | ............... | H04L 67/22 |

OTHER PUBLICATIONS

PCT International Search Report and Written Opinion, PCT Application No. PCT/US2019/043940, dated Sep. 23, 2019, eight pages.

* cited by examiner

DISTRIBUTION OF EMBEDDED CONTENT ITEMS BY AN ONLINE SYSTEM

BACKGROUND

This invention relates generally to the distribution of content by online systems, and in particular to, the selection of content items to be distributed as embedded content items by the online system.

Online systems, such as social networking systems, allow users to connect to and communicate with other users of the online system. Online systems provide content items to users, for example, content items provided by third party systems. The online system presents some content items in conjunction with another content item, for example a video embedded in another video content item. An online system may have access to a large amount of host contents which may be potential candidates for a smaller number of supplementary content items to be distributed as embedded content items. Ineffective distribution of supplementary content items results in providing content items to users that are not interested in viewing the content items. The online system spends communication and computation resources in processing and transmitting content items to users. As a result, conventional techniques often result in wasting computational and communication resources by distributing content items that are not accessed by users. There is need for systems that improve the efficiency of computation and communication for distribution of content items to users.

SUMMARY

An online system distributes content items received from third-party content providers to users of the online system. The online system presents host content items along with supplementary content items. For example, a host video may be presented along with embedded videos. To optimize the delivery of supplementary content items to users within the online system, the online system selects host content items with content quality scores above a periodically computed threshold score.

In an embodiment, the online system receives a plurality of host content items from host content providers and a plurality of supplementary content items from a plurality of supplementary content providers during a first time interval. For a current time interval, the online system receives an allocation representing a number of display instances of the supplementary content items in conjunction with host content items. For each host content provider, the online system may also receive a count of display instances of supplementary content items in conjunction with host content items for the host content provider recorded during a preceding time interval. Additionally, for each host content provider, the online system determines a content quality score based on a level of user interactions associated with content provided by the host content provider and count of display instances of host content items presented in conjunction with supplementary content items for the preceding time interval.

Based on the content quality score of each host content provider, the allocation of display instances of supplementary content items for the first time interval, and the count of display instances for each host content provider over the first time interval, the online system determines a content quality threshold. If the online system determines that the content quality score for a host content provider is above the content quality threshold, the online system presents a host content item from the host content provider in conjunction with a supplementary content item to one or more users of the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online system, such as a social networking system, is used by content providers to distribute content. Content providers in an online system such as a social networking system may be users of the online system or third party providers. Users of the online system may provide content items, for example educational content items, content items describing sports, content items describing current events, and so on. Alternatively, third party content providers who operate entities independent of the online system, may utilize the online system to generate interest among users of the online system in their operations beyond the online system, for example a good or service available for purchase or request. The online system provides opportunities for content received from third party content providers, hereafter referred to as a "supplementary content item", to be presented to users of the online system in conjunction with a content item received from a user of the online system, hereafter referred to as a "host content item."

An online system typically has access to large amounts of content which may be potential candidates for hosting supplementary content compared to the smaller number of supplementary content items. Effective selection of host content to be presented in conjunction with supplementary content decreased the chances of providers with low quality content being able to present the supplementary content items compared to higher quality content items. Additionally, because low quality content correlates with lower user traffic compared to high quality content, the supplementary content may not be distributed to a significant population of users despite the cost incurred for distributing the content items.

The number of host content items may be greater than the number of supplementary content items. As a result, the online system selects a subset of the available host content items to be presented in conjunction with a supplementary content item. Embodiments of the invention determine the quality of host content items received from content providers of the online system and provide supplementary content items in conjunction with host content items having high quality.

System Architecture

Figure 1:
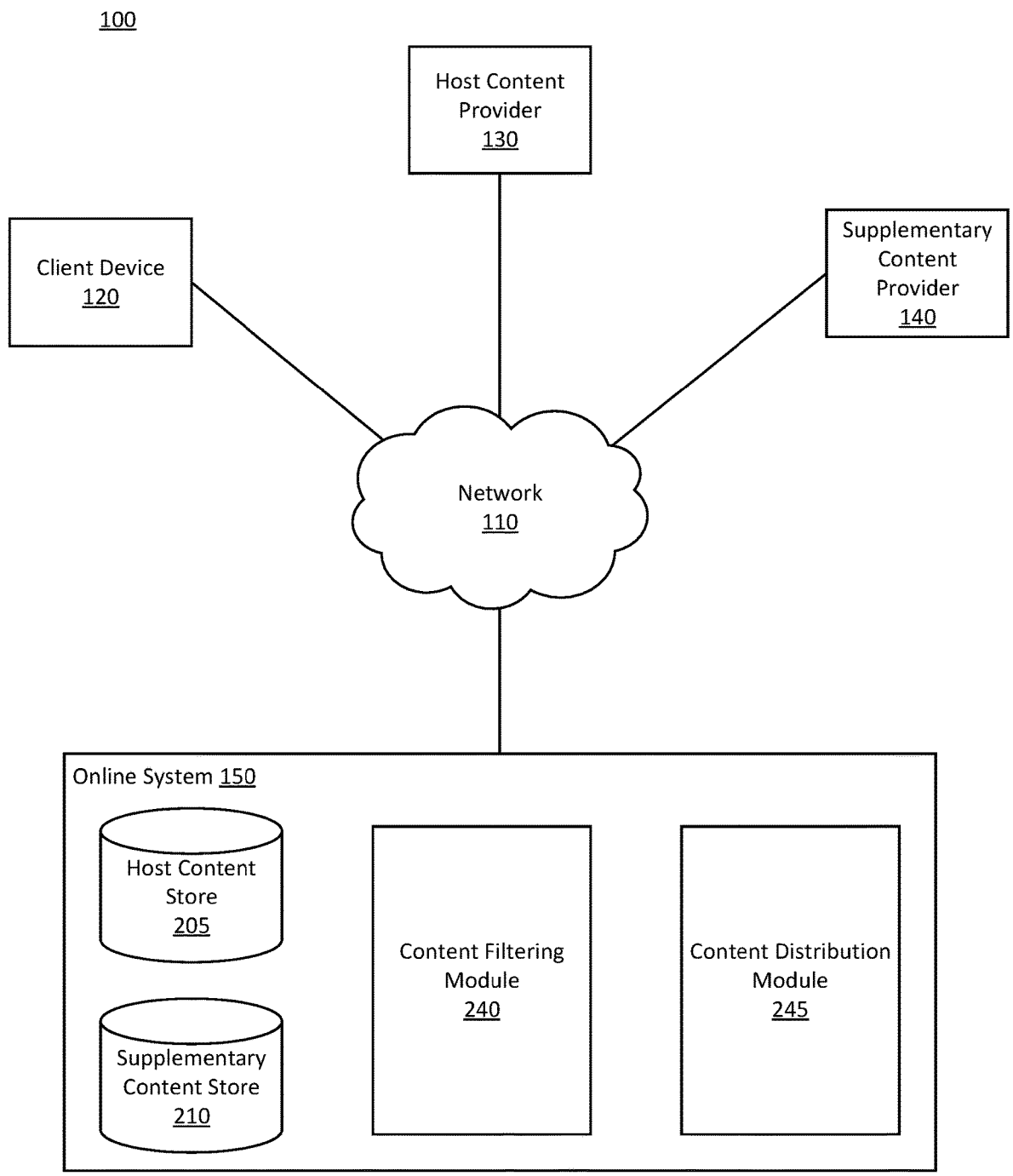
FIG. 1 is a high-level block diagram of a system environment, in accordance with an embodiment.

FIG. 1 is a high-level block diagram of a system environment 100, in accordance with an embodiment. In the embodiment shown by FIG. 1, the system comprises a network 110, client device 120, a host content provider 130, a supplementary content provider 140, and an online system 150. In alternate configurations, different and/or additional components may be included in the system environment. For example, the online system 150 may be a social networking system, a content sharing network, or another system providing content to users. Additionally, the system environment 100 may include any number of client devices 120, host content providers 130, and supplementary content providers 140.\

The client device 120 is a computing device capable of receiving user input as well as transmitting and/or receiving data via the network 110. In one embodiment, a client device 120 is a conventional computer system, such as a desktop or a laptop computer. Alternatively, a client device 120 may be a device having computer functionality, such as a personal digital assistance (PDA), a mobile telephone, a smartphone, or another suitable device. In one embodiment, a client device 120 executes an application (e.g., a web browser) allowing a user of the client device 120 to interact with the online system 150. In another embodiment, a client device 120 interacts with the online system 150 through an application programming interface (API) running on a native operating system of the client device 120, such as IOS® or ANDROID™.

The client devices 120 are configured to communicate via the network 110, which may comprise any combination of local area and/or wide area networks, using both wired and/or wireless communication systems. Communication between the client device 120 and the online system 150 may be bidirectional. The client device 120 may communicate to provide content to the online system 150, for example when operated by a content provider, and the online system 150 may communicate to provide content to the client device 120, for example to be viewed by a viewing user of the online system 150. The system environment of the online system 150 may include more than connected client devices 120, depending on the volume of the users with access to the online system 150.

A host content provider 130 and a supplementary content provider 140 may be associated with a server different from the online system 150 and outside of the domain of the online system 150. Servers of providers 130 and 140 and the online system 150 may communicate over the network 110.

In some embodiments, the supplementary content provider 140 may be associated with an entity (e.g., a content provider or third party) offering one or more assets (e.g., products, services, or information) to users of the online system 150. A supplementary content provider 140 may also communicate content or information describing assets available by the supplementary content provider 140 to the online system 150. Host content providers 130 may be associated with users of the online system 150 responsible for posting personal content or content independent of an entity offering one or more assets (e.g., an article, a video, or a post).

Interactions between the client device 120, the host content provider 130, the supplementary content provider 140, and the online system 150 are typically performed via the network 110, which enables communication between content providing devices and the online system 150. In one embodiment, the network 110 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 110 may also utilize dedicated, custom, or private communication links. The network 110 may comprise any combination of local area and/or wide area networks, using both wired and wireless communication systems.

The online system 150 allows host content items and supplementary content items to be presented to users of the online system via client devices 120, as further described below. The online system 150 receives contents from the host content provider 130 and the supplementary content provider 140 via the network 110 and processes the received content. The online system 150 may identify candidate host content items to be presented in conjunction with a supplementary content item and accordingly present host content items in conjunction with at least one supplementary content item to viewing users within the online system. In one embodiment, the online system 150 includes a host content store 205, a supplementary content store 210, a content filtering module 240, and a content distribution module 245, each of which will be described below in reference to FIG. 2. In some embodiments, the online system 150 includes additional modules or components, as will be described further in reference to FIG. 2.

Figure 2:
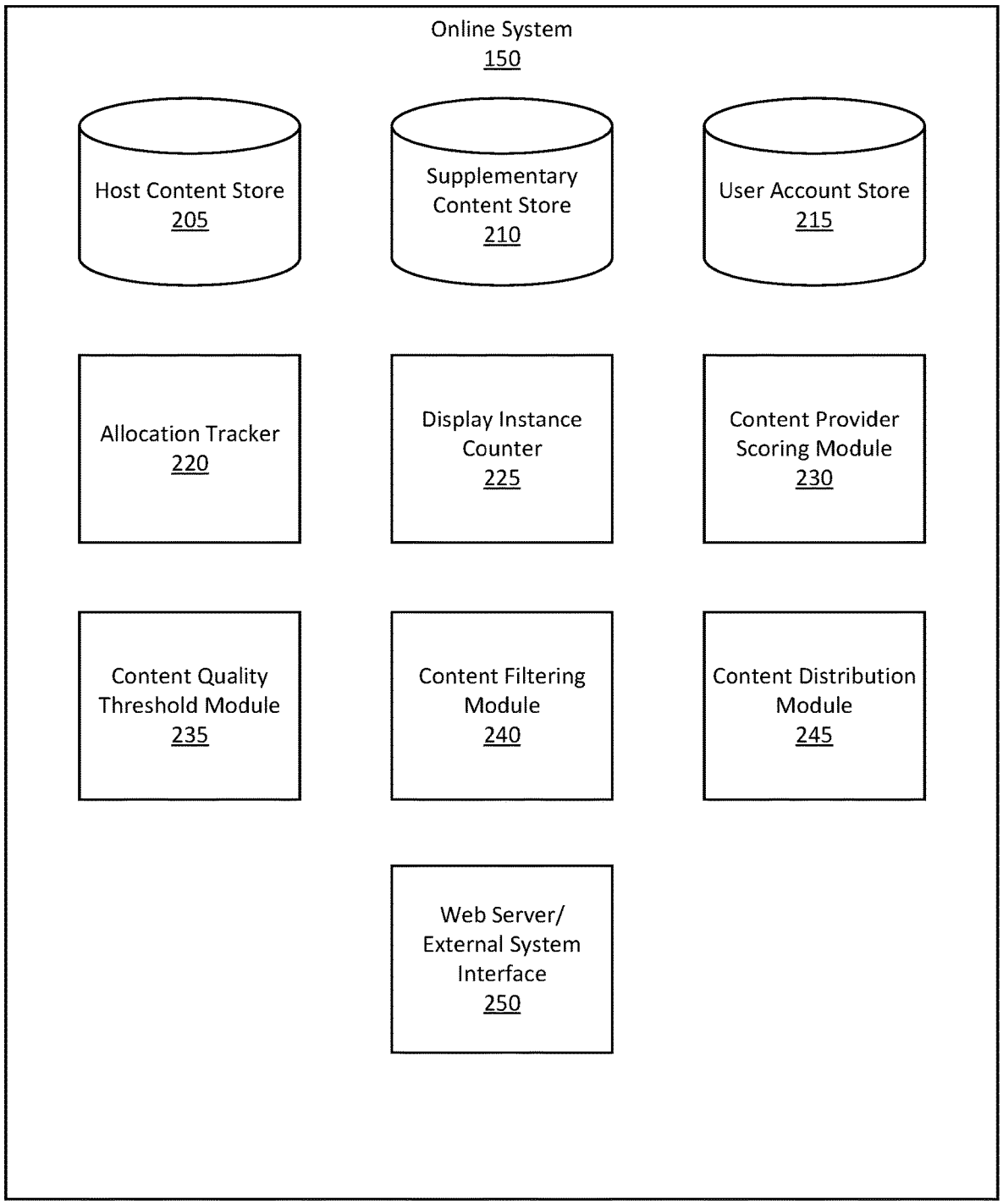
FIG. 2 is a block diagram of the system architecture of the online system, in accordance with an embodiment.

FIG. 2 is a block diagram of the system architecture of the online system 150, according to an embodiment. The online system 150 includes a host content store 205, a supplementary content store 210, an allocation tracker 220, a user account store 215, a display instance counter 225, a content provider scoring module 230, a content quality threshold module 235, a content filtering module 240, and a content distribution module 245, and a web server 250.

The host content store 205 stores content items generated by users of the online system 150 or accessed by users of the online system 150, for example a video recorded by a user or a video of a band which a user supports. The online system 150 receives content items stored within the host content store 205 from entities referred to hereafter as host content providers 130. The supplementary content store 210 stores content items received from third party providers as described above, for example a promotion of goods or services provided by the third party providers. The online system 150 receives content items stored within the provider content store 210 from entities classified as supplementary content providers 140. Both the host content store 205 and the supplementary content store 210 may store metadata associated with each content item in the online system 150 including, for example, the user account of the content provider, targeting criteria associated with the content that describe attributes of users to who the content should be directed and so on.

In various embodiments, a content item includes various components capable of being identified and retrieved by the online system 150. Example components of a content item include: a title, text data, image data, audio data, video data, a landing page, a user associated with the content item, or any other suitable information. The online system 150 may retrieve one or more specific components of a content item for presentation in some embodiments. For example, the online system 150 may identify an image from a content item and provide the image for presentation rather than the content item in its entirety.

Various content items may be associated with an objective that a content provider of the content item expects users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 150 logs interactions between users presented with the content item or with objects associated with the content item. In some embodiments, the online system 150 receives compensation from a user or content provider associated with content item as online system users perform interactions with a content item that satisfy the objective included in the content item.

In one embodiment, supplementary content items are associated with a value describing the benefits associated with presenting the supplementary content item. For example, the value of the supplementary content item may describe a benefit awarded to the host content item presented in conjunction with the supplementary content item. As a result, the online system 150 selects host content items with the highest quality content or the most user interest such that the most qualified host content provider receives the value of the supplementary content item. In one embodiment, the value of the supplementary content item is a monetary value, for example a payout, received from a supplementary content provider 140 as remuneration for presenting the supplementary content item in conjunction with a host content item, for example, as an embedded content item.

In particular embodiments, content within the online system may be associated with one or more privacy settings. Although the examples discussed herein are in the context of an online social network, the privacy settings may be applied to any other suitable computing system. Privacy settings, also referred to as "access settings," for a content item may be stored in any suitable manner, for example in association with the content item in an index on an authorization server, in another suitable manner, or in any combination of suitable manners. A privacy setting for an object may specify how the content item may be accessed, stored, or otherwise used (i.e., viewed, shared, modified, copied, executed, surfaced, or identified) within the online system. In one embodiment, a user of the online system may specify privacy settings for a user account that identify a set of users that may access work-experience information on the user account, thus excluding other users from accessing that information. Similarly, privacy settings may specify a "blocked list" of users or other entities that may not access certain information associated with the object, including content providers. For example, a user may specify a set of users who may not access images associated with the user, thus excluding them from accessing the images while simultaneously allowing certain users not within the specified set of users to access the images.

Privacy settings associated with a content item may specify any suitable granularity of permitted access or denial of access. For example, access or denial of access may be specified for particular users of the online system, users of the online system within a specified degree of separation, users within a particular group or network, or users associated with a third party content provider. The privacy settings as described herein may describe any suitable granularity of permitted access or denial of access.

In some embodiments, different content items of the same type associated with a certain user may have different privacy settings. Different types of objects associated with a user may have different types of privacy settings. For example, a first user may specify that a first user's posted content is available to be viewed by the public, but any images shared by the first user are available only to the first user's friends in the online social network. As another example, a first user may specify a group of users that may view videos posted from the first users while keeping videos from being available to certain users connected to the first user. In some embodiments, different privacy settings may be established by the online system 150 for different users groups or user demographics.

In some embodiments, a user may specify whether particular types of content items or information associated with the first user may be accessed, stored, or used by the online system 150. For example, the first user may specify that images sent by the first user through the online system 150 may not be stored by the online system 150. As another example, a first user may specify that messages sent from the first user to a particular second user may not be stored by the online system 150. As a further example, a first user may specify that all content items sent via a particular application may be saved by the social-networking system 160.

In additional embodiments, privacy settings may allow a first user to specify whether particular content items or information associated with the first user may be accessed from particular providers. The privacy settings may allow the first user to opt in or opt out of having objects or information accessed from a particular device (e.g., the phone book on a user's client device), from a particular application (e.g., a messaging application), or from a particular system (e.g., an email server). The online system 150 may provide default privacy settings with respect to each device, system, or application, and/or the first user may be prompted to specify a particular privacy setting for each context. For example, the first user may utilize a location-services feature of the online system 150 to provide recommendations for restaurants or other places in proximity to the user. The first user's default privacy settings may specify that the online system 150 may use location information provided from a client device of the first user to provide the location-based services, but that the online system 150 may not store the location information of the first user or provide it to any content provider. The first user may then update the privacy settings to allow location information to be used by a third-party image-sharing application in order to geo-tag photos.

The user account store 215 stores account data describing profiles of users within the online system 150. A user profile includes historical information describing a user's activity within the online system, for example images and videos that they have posted, viewed, or received and webpages or profiles that they have recently viewed or visited. A user profile in the user account store 215 may also maintain references to actions or interactions with content items performed by the corresponding users on content items within the host content store 205. While user profiles in the user account store 215 are frequently associated with individuals, allowing individuals to interact with each other via the online system 150, user profiles may also be stored for host content providers 130 and supplementary content providers 140. This allows providers 130 and 140 to establish a presence in the online system 150 for connecting and exchanging content with other online system users. A provider 130 or 140 may post information about itself, about its assets, or provide other information to users of the online system 150 using a brand page. Other users of the online system 150 may connect to the brand page to receive information posted to the brand page or to receive information from the brand page.

The allocation tracker 220 identifies opportunities for the online system 150 to present supplementary content items to users of the online system 150, hereafter referred to as "display instances". A display instance is also referred to as an "impression" of the supplementary content item in conjunction with the host content item. The same content item may have multiple display instances, for example, as a result of presenting the content item to different users or as a result of presenting the content item to the same user multiple times. In some embodiments, the allocation tracker 220 records and monitors the distribution of host content items within the host content store 205 to users of the online system 150 and the activity of users stored in the user account store 215. In some embodiments, the distribution data collected by the allocation tracker 220 is stored within the host content store 205. Alternatively, the allocation tracker 220 stored the collected data. Host content items eligible for presentation to users of the online system 150 may be presented more than once to a single user or to multiple users within the online system 150. For example, a first user may watch a video about a popular sports team, presenting a first opportunity, and may post the video on a public page where a second and third user also watch the video, presenting a second and third opportunity. Each interaction between a user of the online system 150 and the video is an independent opportunity for the online system 150 to present a supplementary content item in conjunction with a host content item. Examples of interactions between a user of the online system 150 and a host content item include, but are not limited to, viewing a content item, clicking a content item, forwarding a content item, etc. Additionally, the type of interaction may present multiple opportunities to present supplementary content items in conjunction with a host content time. For example, a user viewing a video may generate multiple opportunities to display a supplementary content item, but a user clicking video may only generate a single opportunity.

In one embodiment, the allocation tracker 220 determines a count of display instances of a content item based on a measure provided by the content provider. Accordingly, the content provider provides a value indicating an expected number of display instances of a content item provided by the content provider. For example, the content provider may specify a budget indicating the amount of resources that the content provider would like to spend within a time interval. The online system 150 determines the estimate of the count of display instances based on the budget.

In some embodiments, the allocation tracker 220 may record an allocation or count of available supplementary content items stored within the supplementary content store 210. In some embodiments, the number of available supplementary content items may be considered a constraint on the allocation of display instances. When the number of host content items stored exceed the number of supplementary content items, the online system 150 selects a subset of host content items depending on the number of supplementary content items, which in turn are distributed as opportunities for the online system to present users with supplementary content items in conjunction with a host content item.

In some embodiments, the allocation tracker 220 determines an allocation of display instances for a content item dynamically over an interval of time. The allocation of display instances refers to an estimate of number of times the content item is presented to users. In an embodiment, the online system 150 receives a budget value associated with a content item from the content provider and uses the budget value to determine the allocation of display instances for a given content item. The allocation tracker 220 determines a number of display instances for a current interval based on the number of available supplementary content items and host content items during the current interval, the number of opportunities presented by each host content item during a previous time interval, and trends describing user interactions with each content item. In one implementation, the number of display instances are directly related to the number of available supplementary content items and the number of opportunities presented by each host content item during a previous time interval. The number of display instances may also increase as trends of user interactions indicate increased user interest in the selected host content items (i.e., sharing host content items with other users).

Alternatively, the allocation tracker 220 determines an allocation of display instances for an interval of time based on the amount of host content items, supplementary content items, and display instances from a previous interval of time. As described above, the allocation of display instances may be directly related to the amount of host content items selected to be presented in conjunction with a supplementary content item and the number off display instances recorded from a previous time interval. For example, if the number of display instances recorded for a previous interval of time is very high, the allocation tracker 220 may adjust the allocation of display instances for the current time period to reflect a greater projection.

Additionally, embodiments of the allocation tracker 220 dynamically update the number of opportunities for display instances as content is added to the host content store 205 and the supplementary content store 210 or as the user account store 215 records additional user interactions. Once updated, the allocation tracker 220 provides an updated allocation of display instances to the online system. For example, if the amount of supplementary content items stored in the supplementary content store 210 increases and, resultantly, the amount of host content items selected to be presented in conjunction with a supplementary content item also increases, the allocation tracker 220 adjusts the projected number of display instances for the current, or subsequent, interval of time.

While the allocation tracker 220 determines an initial allocation of display instances within the online system, or an initial amount of opportunities to present supplementary content items in conjunction with a host content item, the display instance counter 225 records a count of the number of times a host content item is presented in conjunction with a supplementary content item. The display instance counter 225 dynamically increments the counter each time a host content item is actually presented to a user in conjunction with a supplementary content item over an interval of time. The display instance counter 225 increments the presentation of each host content item over the current interval and stores it to be referenced during the subsequent time interval. In implementations in which a host content item is presented to users of the online system multiple times, the display instance counter 225 determines a frequency with which each host content item is presented in conjunction with a supplementary content item. In one implementation, the display instance counter 225 organizes the records describing the display instances of each host content item based on the host content provider 130 responsible for providing for the host content item.

To determine whether a host content item is eligible to be presented in conjunction with a supplementary content item, the online system 150 analyzes the quality of multiple host content items based on the quality score of their provider 130 and selects eligible host content items based on their quality. The content provider scoring module 230 determines a content quality score for each host content provider based on levels of user interaction with content items associated with that provider. For example, host content items associated with host quality providers 130 with low levels of user interaction are assigned lower content quality scores. Once determined, the content quality score is representative of the level of user interest in the average host content item provided by a host content provider 130. In some embodiments, host content items with lower level of user interest can be associated with lower quality content, which may be responsible for the decrease in user interest. Comparatively, host content items with higher levels of user interest can be associated with higher quality content, which may be responsible for the increase in user interest.

The content quality score may be determined as an average of the user interaction with that content item across multiple users to whom the host content item has been presented. Examples of the levels of user interactions which are factored into the content quality score include, but are not limited to, the rate at which users click on the host content item, the rate at which users view the host content item, the rate at which users send the host content item to a different user within the online system, the rate at which users view an account of the host content provider, and the rate at which users navigate to an off-site page of the host content provider. In some embodiments, the different levels of interaction may be weighted differently depending on the level of user interest associated with each interaction. For example, a user navigating to an off-site page associated with a host content item may be assigned a higher weight than a user viewing a host content item. As a result a host content item which navigates a group of users to an off-site landing page may receive a higher content quality score than a host content item which a larger amount of users have only viewed. In some embodiments, the content quality score can be periodically recalculated and determined at the conclusion of one or more time intervals.

In one embodiment, a content quality score may be a whole number within a defined range where numbers closer to the upper limit of the range indicate a higher quality of content. In another embodiment, the content quality score is a fraction between 0 and 1 where values closer to 1 indicate a higher quality of content. Alternatively, the content quality score may be assigned a binary label where one label indicates a high content quality score and the other indicates a low content quality score. The content quality score may receive a threshold value bifurcating the range of potential content quality scores into a first range indicating a high content quality score and a second range indicating a low content quality score. Any values within the first range are assigned a common label and any values within the second range are assigned a common label different from that of the first range, for example 0 and 1. For example, for a content quality score with a threshold value of 0.6, any content quality scores between 0.0 and 0.6 are assigned a "0" while content quality scores between 0.6 and 1 are assigned a "1."

The content quality threshold module 235 determines a threshold value against which content quality scores for each host content items are compared to determine their eligibility. In one embodiment, host content items with content scores above the threshold value are eligible to be presented in conjunction with supplementary content items, whereas host content items with content scores below the threshold value are not eligible to be presented in conjunction with supplementary content items. In some embodiments, the threshold value can be determined as a function of the content quality score, the count of host content items presented in conjunction with supplementary content items for each host content provider 130, and the allocation of display instances for the current time period. In one embodiment, the content quality threshold is determined by taking the multiplicative product of the content quality score and the count of host content items presented in conjunction with a supplementary content item for each host content provider 130 and aggregating the multiplicative products. The resulting value of the aggregation may also be divided by the allocation of display instances for the current time period as determined by the allocation tracker 220. Accordingly, in the described embodiment, the content quality threshold is directly proportional to the content quality score and count of host content items presented in conjunction with a supplementary content item for a host content provider 130, but indirectly proportional to the allocation of display instances determined by the allocation tracker 220. In such an embodiment, the content quality threshold is determined using the following equation:

$$T_Q = \frac{\sum (S(i))(C(i))}{A\_d}$$

In the equation shown above, $T_Q$ is representative of the content quality threshold for a given interval of time. $S(i)$ is representative of the content quality score for a given host content provider i at the start of the given interval, $C(i)$ is representative of the count of display instances for a host content provider i at a preceding interval of time, and $A\_d$ represents the allocation of display instances for the current interval of time. The value $A\_d$ is directly related to an estimate of budget specified for a content item by a content provider, wherein the budget specifies the amount of resources the content provider is willing to spend for presenting the content item to users of the online system. The online system 150 may associate a measure of cost for each display instance of a content item. The cost of a display instance may depend on several factors including, for example, the type of use being presented with a content item, the likelihood of the user accessing the content item, the likelihood of the user performing certain user actions responsive to viewing the content item as specified by the content provider, etc.

In embodiments where the content quality scores are binary values, the aggregate of the product of the content quality score and count of display instances for each host content provider is representative of the total count of display instances during the previous time interval. For example, over an interval of time, five host content providers 130, H1, H2, H3, H4, and H5, may have received content quality scores of 0, 1, 1, 0, and 0, respectively, where a score of 0 indicates a low content quality and a score of 1 indicates high content quality. Because host content providers H1, H4, and H5 received content quality scores indicating low quality scores, no associated host content items were selected to be presented in conjunction with a supplementary content item. Accordingly, the counts of display instances for H1, H4, and H5 were 0. However, because host content providers H2 and H3 received content quality scores indicating high quality scores, one or more of their host content items were selected to be presented in conjunction with a supplementary content items. Accordingly, the counts of display instances for H2 and H3 are non-zero values, for example X and Y. Assuming H1, H2, H3, H4, and H5 were the only host content providers 130 stored within the host content store 205 and because the multiplicative product of a count of display instances and a content quality score of 1 is the count of display instances for a previous time period can be represented as a sum of the count of display instances for each provider. At an allocation of display instances greater than 0, the content quality threshold is equivalent to:

$$(0)(0)+(1)(X)+(1)(Y)+(0)(0)+(0)(0)=X+Y$$

where X+Y, or the sum of the count of display instances for the high content quality host content providers 130.

In an alternate embodiment, where the content quality scores are a range of values between 0 and 1, host content providers 130 with higher content quality scores and a higher count of display instances are weighted higher in the above equation, resulting in an increase in the content quality threshold. For example, over a first interval of time, five host content providers 130, H1, H2, H3, H4, and H5 may have received identical content quality scores of 0.5 and identical counts of display instances of 3. At an allocation of display instances of 5, the content quality threshold is equivalent to:

$$\frac{(0.5)(3)+(0.5)(3)+(0.5)(3)+(0.5)(3)+(0.5)(3)}{5}=1.5$$

If, at a subsequent interval of time, the content quality score of H1 increases to 0.6, resulting in the marginal increase equivalent to:

$$\frac{(0.6)(3)+(0.5)(3)+(0.5)(3)+(0.5)(3)+(0.5)(3)}{5}=1.56$$

Alternatively, if, at the second interval of time, the count of display instances of H1 increases to 4 while the content quality score of H1 is constant at 0.5, resulting in the marginal increase equivalent to:

$$\frac{(0.5)(4)+(0.5)(3)+(0.5)(3)+(0.5)(3)+(0.5)(3)}{5}=1.6$$

However, during intervals in which the content quality score of a first host content provider, for example H1, increases relative to other host content providers, for example H2, H3, H4, and H5, within the host content store 205, the count of display instances of H1 also increases relative to other host content providers H2, H3, H4, and H5. Because of the improvement in content quality score of H1 over H2, H3, H4, and H5, the content filtering module 240 and content distribution module 245 favors host content items associated with host content provider H1. As a result, if at a second interval of time, only the content quality score H1 increases to 0.6, the count of display instances for H1 also increases, for example from 3 to 4, resulting in the content quality threshold increasing to:

$$\frac{(0.6)(4)+(0.5)(3)+(0.5)(3)+(0.5)(3)+(0.5)(3)}{5}=1.68$$

Consistent with the trends described below, decreases in the content quality score or count of display instances for a host content item result in a decrease in the content quality threshold determined by the content quality threshold module 235. A decrease in the content quality score of a first host content provider relative to other second host content providers, results in a decrease in the count of display instances for the first host content provider and therefore a decrease in the content quality threshold.

Once the content quality threshold has been established, the content filtering module 240 compares the content quality score for a host content provider 130 to the content quality threshold. For host content providers 130 with content quality scores above the content quality threshold, the content filtering module 240 identifies and may add any host content items associated with the provider to a white list representing content items eligible for presentation in conjunction with a supplementary content item. For host content provider 130 with content quality scores below the content quality threshold, the content filtering module 240 identifies and may add any host content items associated with the provider to a black list representing content items ineligible for presentation in conjunction with a supplementary content item. In alternate embodiments, the content filtering module 240 does not add content items to a white or black list, but rather differentiates between eligible and ineligible content items using different markers or flags. In one embodiment, ineligible content items are removed from the host content store 205 altogether, however in additional embodiments ineligible content items may remain within the host content store 205 in case the content quality score for their provider improves over the subsequent interval of time.

From the white list of eligible host content items, the content distribution module 245 selects and presents content items relevant to users of the online system 150. From the supplementary content store 210, the content distribution module 245 selects supplementary content items and presents them with an eligible host content item to a user of the online system. In response to determining that the content quality score for a host content provider is above the content quality threshold, the content distribution module 245 identifies a supplementary content item from the supplementary content store 210 to be presented in conjunction with the host content item. The web server 250 links the online system 150 via the network 110 to the one or more client devices 120, as well as to the one or more providers. The web server 250 serves web pages, as well as other content, such as JAVA®, FLASH®, XML and so forth. The web server 250 may receive and route messages between the online system 150 and the client device 120, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Presenting Supplementary Content Items in Conjunction with Host Content Items

Figure 3:
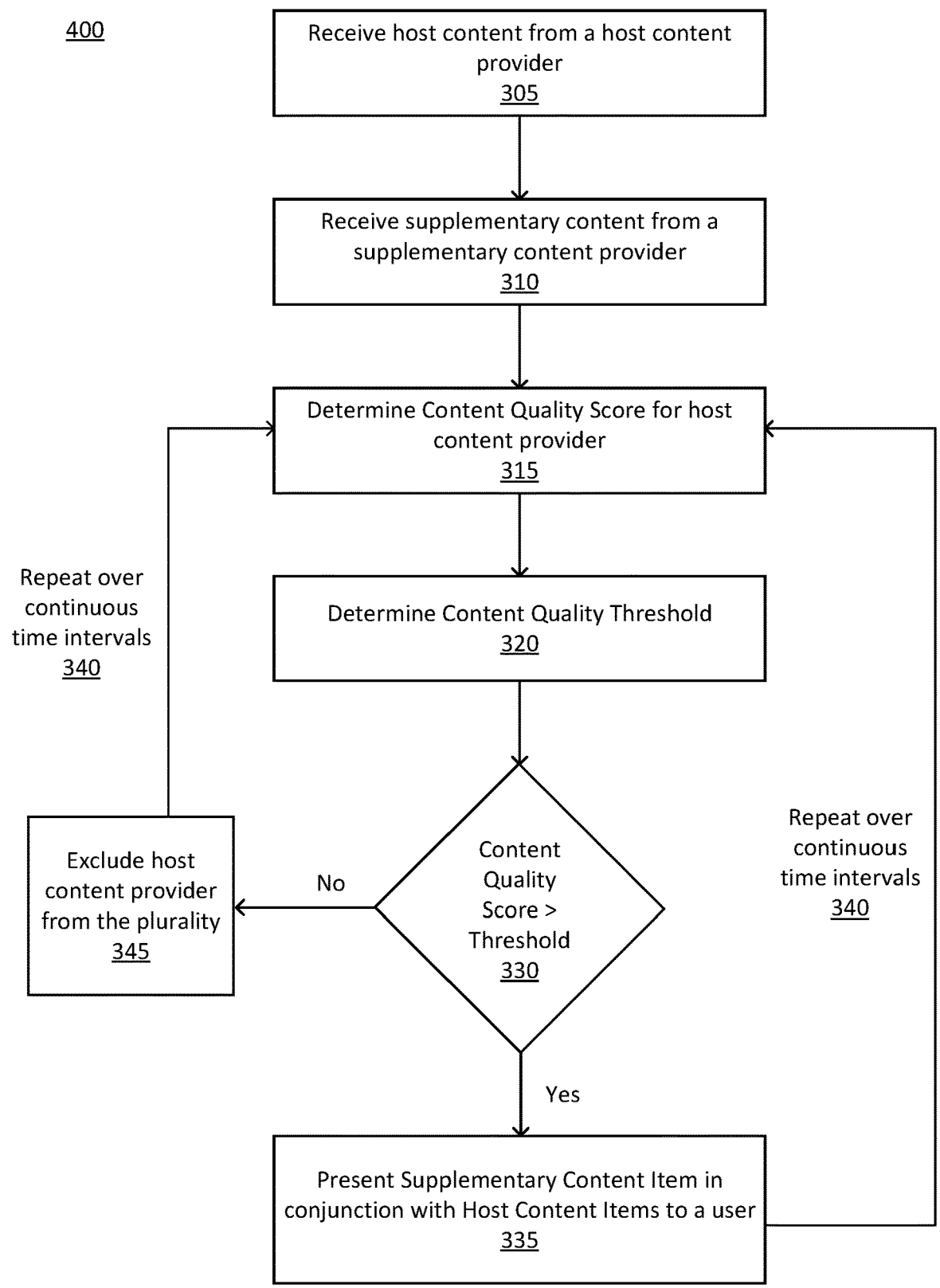
FIG. 3 is a flowchart describing the process for presenting a supplementary content item, in accordance with an embodiment.

As described above, supplementary content items stored with the supplementary content store 210 are presented in conjunction with a host content item. FIG. 3 is a flowchart describing the process for presenting a supplementary content item, in accordance with an embodiment.

The host content store 205 receives 305 host content from a host content provider 130. The supplementary content store 210 receives 310 supplementary content from a supplementary content provider 140. In some embodiments, the supplementary content store 210 receives supplementary content from the supplementary content provider 140 substantially simultaneously with the host content store 205 receiving host content from a host content provider 130. In alternate embodiments, the supplementary content stores 210 receives supplementary content items at a rate independent of the rate at which the host content store 205 receives host content items. The content provider scoring module 230 determines 315 a content quality score for each host content provider 130 associated with host content items within the host content store 205 describing the level of user interest in the host content item and the quality of content within the host content item. The content quality threshold module 235 determines 320 a content quality threshold against which the content filtering module 240 compares 330 the content quality score for each host content provider 130. The content quality threshold is determined based on the considerations described above in reference to the content quality threshold module 235.

When comparing 330 the content quality score to the content quality threshold, the content filtering module 240 may determine that the content quality score for a host content provider 130 is greater than the content quality threshold previously determined and flag all host content items associated with the aforementioned host content provider 130 as described above, for example by assigning a label to each host content item or by adding each host content item to a white list. Flagged host content items are identified as eligible for presentation to users of the online system 150 in conjunction with a supplementary content item of the supplementary content store 210. In one embodiment, the content filtering module 240 ranks the eligible host content items in terms of content quality score. When selecting supplementary content items for presentation in conjunction with a host content item, the content filtering module 240 may assign the highest valued supplementary content items to host content items with the highest content quality score. Based on the considerations made by the content filtering module 240, the content distribution module 245 identifies and presents 335 supplementary content items in conjunction with a host content items to users of the online system.

Periodically, the online system repeats 340 steps 315-335 to continuously update metadata describing one or more of the content items within the host content store 205 and the supplementary content store 210, the content quality score and count of displayed instances for each host content item, and the allocation of display instances within the online system 150, the aggregate of content quality scores, or the content quality threshold. The aforementioned updates may be performed in response to the conclusion of predetermined time intervals, the receipt of new host content item or supplementary content item by the online system 150, or an alternative factor within the online system 150.

When comparing 330 the content quality score to the content quality threshold, the content filtering module 240 may determine that the content quality score for a host content provider 130 is less than the content quality threshold previously determined and flag all host content items associated with the aforementioned host content provider 130 as described above, for example by assigning a label to each host content item or by adding each host content item to a black list. The content filtering module 240 excludes 345 the blacklisted host content items and host content providers 130 from the plurality of host content items and host content providers stored within the host content provider store 205. After excluding the host content items, the online system repeats 340 steps 315-330 to periodically update, filter, and exclude host content items or host content providers or host content items from the host content store 205.

Determining a Content Quality Threshold

Figure 4:
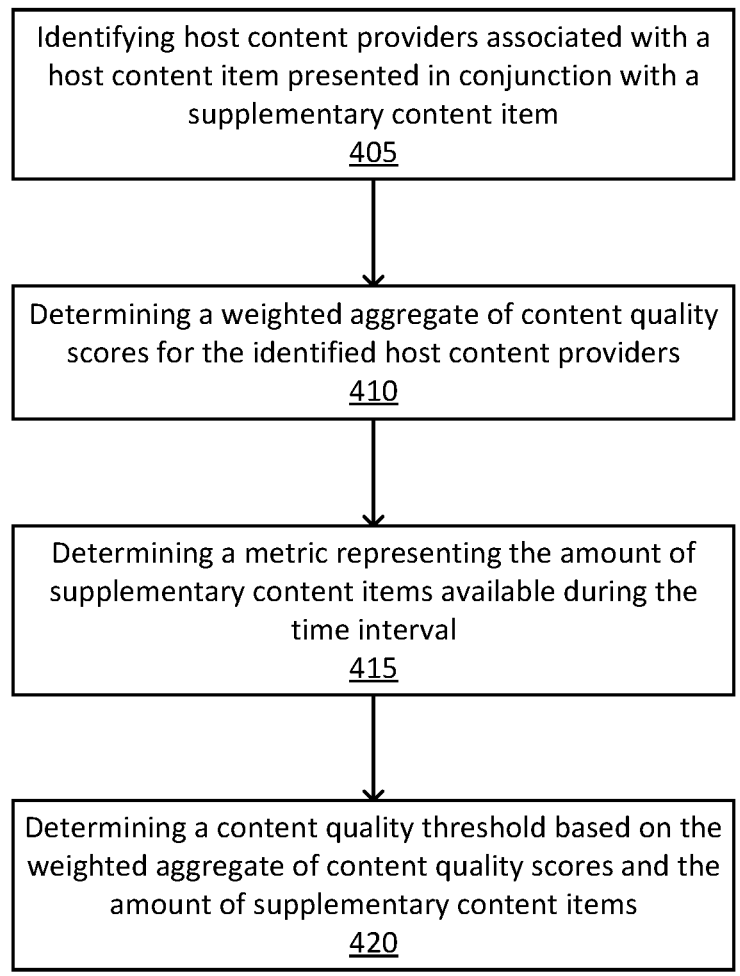
FIG. 4 is a flowchart describing the process for determining a content quality threshold for a content item.

As described above, the content quality threshold module 235 determines a content quality threshold against which each host content provider's content quality scores is compared. FIG. 4 is a flowchart describing the process for determining a content quality threshold for a content item.

The display instance counter 225 identifies 405 host content providers 130 associated with a host content item that was presented in conjunction with a supplementary content item during a previous interval of time. For each identified host content provider 130, the display instance counter 225 also records a count of display instances for the provider 130 during that time. As described above, the count of display instances describes the amount of times a host content item was presented in conjunction with a supplementary content item to a user of the online system 150. In some implementations, a host content item may be presented with a supplementary content item to multiple users of the online system resulting in multiple display instances for a single host content item.

As described above, the content quality threshold module 235 determines 410 a weighted aggregate of the content quality score and count of display instances for each host content provider 130. At the conclusion of a previous time interval or the start of a current time interval, the allocation tracker 220 determines 415 a metric such as the allocation of display instances which functions as a metrics representing amount of supplementary content items available during the time interval. The determined allocation of display instances may be referred to as a budget for presenting the supplementary content items by the online system. Accordingly, the number of display instances of the supplementary content items within a time interval depend on the allocated budget. In an embodiment, there is a cost associated with each display instance and the online system 150 ensures that the total cost of all display instances within a time interval for a context provider stay within the allocated budget. The cost of a display instance may represent a remuneration provided by the content provider to the online system 150 for presenting the content items to the users of the online system. In an embodiment, the cost of presenting a content item may depend on various factors including a supply of the other supplementary content items at that time, user profile attributes of the user to whom the supplementary content item is presented, the type of user interface on which the supplementary content item is presented, and so on. Finally, based on the allocation of display instances and the weighted aggregate of the content quality score and count of display instances for each host content provider 130, the content quality threshold module 235 determines 420 a content quality threshold consistent with the trends and relationships described above.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
receiving, during a current time interval, host videos from a plurality of host content providers and a plurality of supplementary videos from a plurality of supplementary content providers, wherein each supplementary video is for presentation in conjunction with a host video;
determining an allocation of display instances of supplementary videos in conjunction with host videos during the current time interval;
receiving, for a preceding time interval, for each host content provider, a count of display instances of supplementary videos presented in conjunction with host videos for the host content provider;
for each host content provider of the plurality, determining a content quality score based on a level of user interactions associated with host videos received from the host content provider and a count of display instances of host videos for the host content provider that were presented in conjunction with supplementary videos for the preceding time interval;
determining a content quality threshold based on the content quality score of each host content provider, the allocation of display instances of supplementary videos in conjunction with host content videos during the current time interval, and the count of display instances of host videos of the host content provider were presented in conjunction with supplementary video for the preceding time interval;
responsive to determining that the content quality score for a host content provider is above the content quality threshold, presenting a host video from the host content provider to a user of an online system;
responsive to receiving an interaction between the user and the presented host video, determining a count of opportunities for presenting supplementary videos in conjunction with the presented host video based on a type of the interaction between the user and the presented host video; and
responsive to selecting a supplementary video for each counted opportunity, embedding each supplementary video throughout the presented host video to present the host video in conjunction with the selected supplementary videos to one or more users of the online system.

2. The method of claim 1, wherein determining the content quality score is based on levels of user interactions, the user interactions comprising one or more of the following:
a rate at which users click on the host video;
a rate at which users view the host video;
a rate at which users send the host video to a different user within the online system;
a rate at which users view an account of the host video; and
a rate at which users navigate to an off-site page of the host video.

3. The method of claim 1, wherein the count of display instances of host videos for each host content provider that were presented in conjunction with supplementary videos further comprises:
a list of host videos presented in conjunction with a supplementary video; and
a frequency with which each host video of the list of host videos was presented in conjunction with a supplementary video.

4. The method of claim 1, wherein determining the content quality threshold further comprises:
for the plurality of host content providers, aggregating, for each host content provider, a product of the content quality score and the count of display instances of host videos that were presented in conjunction with supplementary videos for the preceding time interval.

5. The method of claim 1, wherein the content quality threshold is directly proportional to the content quality score of each host content provider and the count of display instances of host videos that were presented in conjunction with supplementary videos for each host content provider for the preceding time interval.

6. The method of claim 1, wherein the content quality threshold is inversely proportional to the allocation of display instances for the current time interval.

7. The method of claim 1, further comprising, updating one or more of the following at a conclusion of the current time interval:
the content quality score for each host content provider of the plurality;
an aggregate of content quality scores;
the allocation of display instances;
each count of host videos presented in conjunction with a supplementary video; and
the content quality threshold.

8. The method of claim 1, further comprising:
responsive to determining that the content quality score for a host content provider is below the content quality threshold, excluding host videos provided by the host content provider from the plurality for the current time interval; and
determining a content quality score for a second host content provider of the plurality.

9. The method of claim 1, further comprising:
responsive to determining that the content quality score for the host content provider is above the content quality threshold, identifying a supplementary video from the plurality of supplementary videos to be presented in conjunction with the host video.

10. A non-transitory computer readable medium storing instructions that, when executed by a processor, cause the processor to:
receive, during a current time interval, host videos from a plurality of host content providers and a plurality of supplementary videos from a plurality of supplementary content providers, wherein each supplementary video is for presentation in conjunction with a host video;
determine an allocation of display instances of supplementary videos in conjunction with host videos during the current time interval;
receive, for a preceding time interval, for each host content provider, a count of display instances of supplementary videos presented in conjunction with host videos for the host content provider;
for each host content provider of the plurality, determine a content quality score based on a level of user interactions associated with host videos received from the host content provider and a count of display instances of host videos for the host content provider that were presented in conjunction with supplementary videos for the preceding time interval;
determine a content quality threshold based on the content quality score of each host content provider, the allocation of display instances of supplementary videos in conjunction with host content videos during the current time interval, and the count of display instances of host videos of the host content provider were presented in conjunction with supplementary video for the preceding time interval;
responsive to determining that the content quality score for a host content provider is above the content quality threshold, present a host video from the host content provider to a user of an online system;
responsive to receiving an interaction between the user and the presented host video, determine a count of opportunities for presenting supplementary videos in conjunction with the presented host video based on a type of the interaction between the user and the presented host video; and
responsive to selecting a supplementary video for each counted opportunity, embed each supplementary video throughout the presented host video to present the host video in conjunction with the selected supplementary videos to one or more users of the online system.

11. The non-transitory computer readable storage medium of claim 10, wherein determining the content quality score is based on levels of user interactions, the user interactions comprising one or more of the following:
a rate at which users click on the host video;
a rate at which users view the host video;
a rate at which users send the host video to a different user within the online system;
a rate at which users view an account of the host video; and
a rate at which users navigate to an off-site page of the host video.

12. The non-transitory computer readable storage medium of claim 10, wherein the count of display instances of host videos for each host content provider that were presented in conjunction with supplementary videos further comprises:
a list of host videos presented in conjunction with a supplementary video; and
a frequency with which each host video of the list of host videos was presented in conjunction with a supplementary video.

13. The non-transitory computer readable storage medium of claim 10, wherein instructions for determining the content quality threshold further cause the processor to:
for the plurality of host content providers, aggregate for each host content provider, a product of the content quality score and the count of display instances of host videos that were presented in conjunction with supplementary videos for the preceding time interval.

14. The non-transitory computer readable storage medium of claim 10, wherein the content quality threshold is directly proportional to the content quality score of each host content provider and the count of display instances of host videos that were presented in conjunction with supplementary videos for each host content provider for the preceding time interval.

15. The non-transitory computer readable storage medium of claim 10, wherein the content quality threshold is inversely proportional to the allocation of display instances for the current time interval.

16. The non-transitory computer readable storage medium of claim 10, further comprising instructions that cause the processor to update one or more of the following at a conclusion of the current time interval:
the content quality score for each host content provider of the plurality;
an aggregate of content quality scores;
the allocation of display instances;
each count of host videos presented in conjunction with a supplementary video; and
the content quality threshold.

17. The non-transitory computer readable storage medium of claim 10, further comprising instructions that cause the processor to:
responsive to determining that the content quality score for a host content provider is below the content quality threshold, exclude host videos provided by the host content provider from the plurality for the current time interval; and determine a content quality score for a second host content provider of the plurality.

18. The non-transitory computer readable storage medium of claim 10, further comprising instructions that cause the processor to:
responsive to determining that the content quality score for the host content provider is above the content quality threshold, identify a supplementary video from the plurality of supplementary videos to be presented in conjunction with the host video.

* * * * *